Nov. 12, 1968   J. B. KAHOUN   3,411,075
GAUGE MEANS FOR MEASURING CALIPER PROFILE OF TRAVELING WEBS
Filed Oct. 3, 1963   2 Sheets-Sheet 1
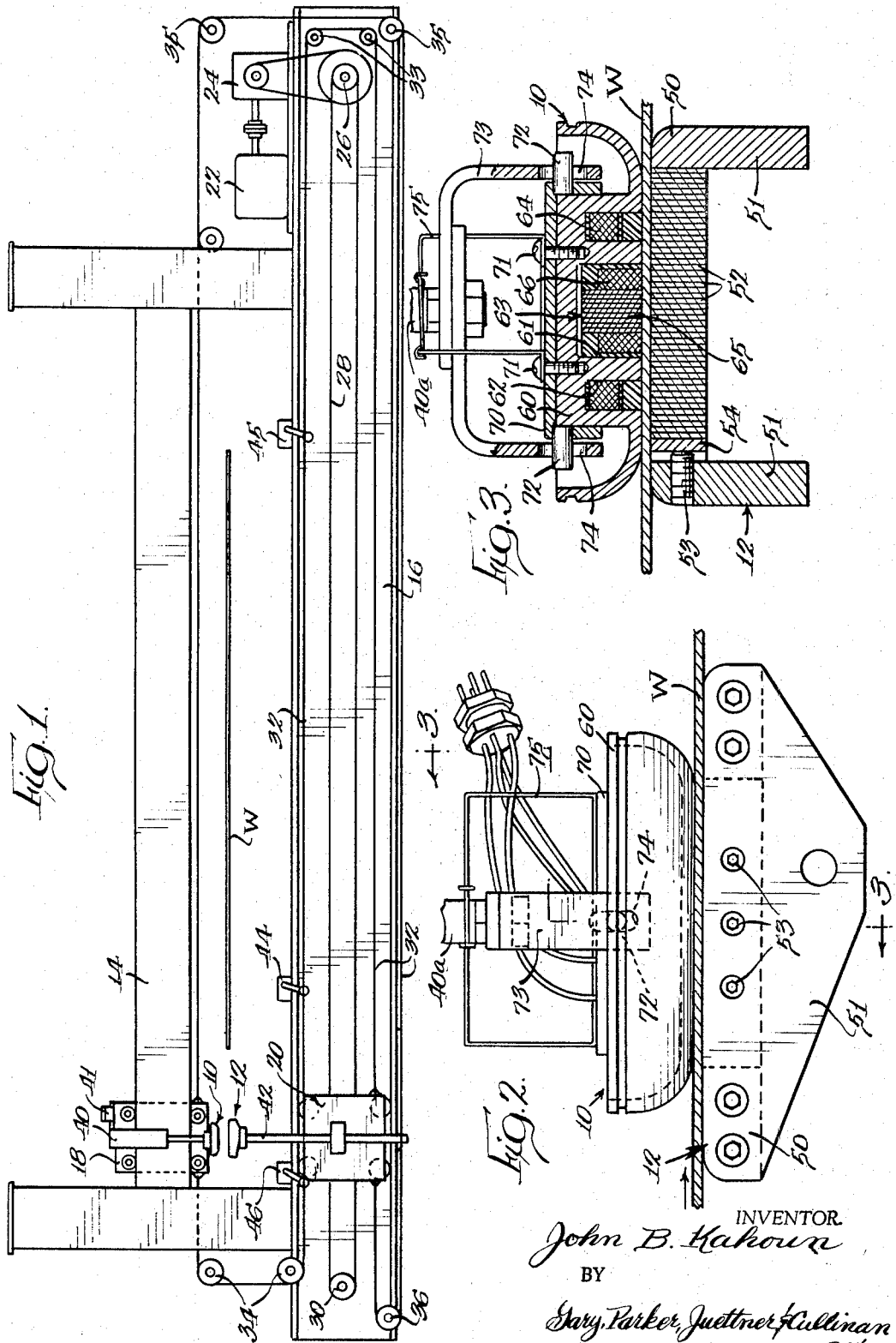
INVENTOR.
John B. Kahoun
BY
Gary, Parker, Juettner & Cullinan
Att'ys Nov. 12, 1968   J. B. KAHOUN   3,411,075
GAUGE MEANS FOR MEASURING CALIPER PROFILE OF TRAVELING WEBS
Filed Oct. 3, 1963                                    2 Sheets-Sheet 2
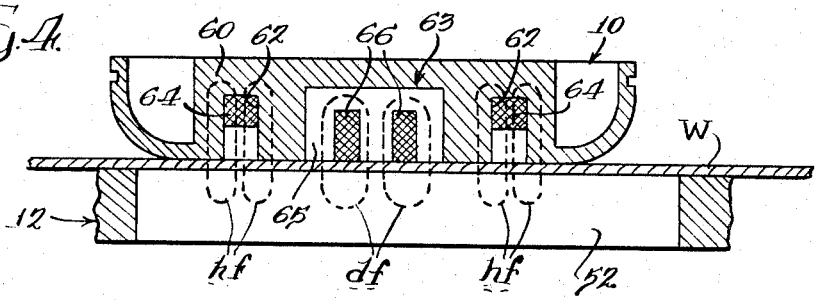
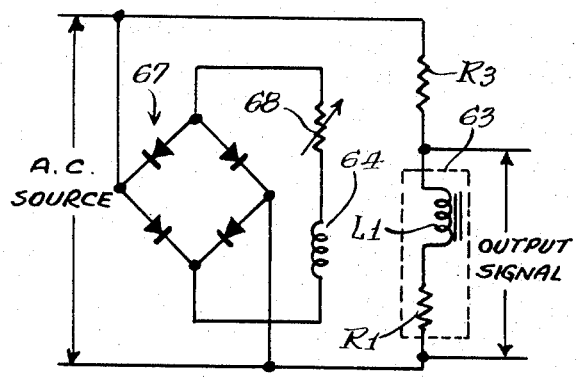
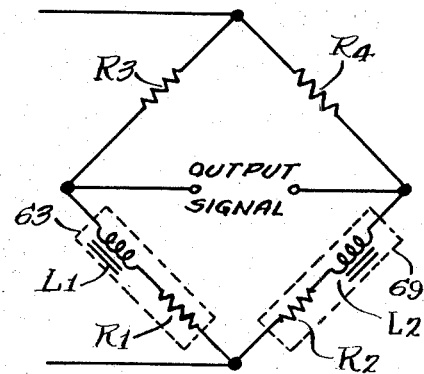
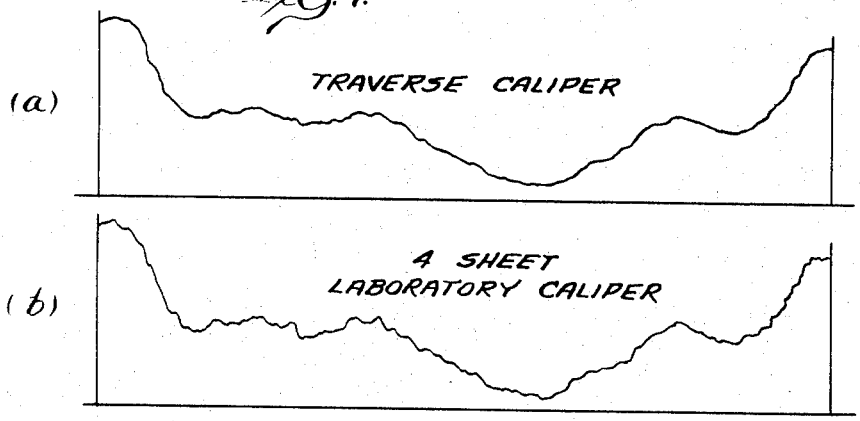
INVENTOR.
John B. Kahoun
BY
Gary, Parker, Juettner & Cullinan
Attys United States Patent Office 3,411,075
Patented Nov. 12, 1968

3,411,075
GAUGE MEANS FOR MEASURING CALIPER
PROFILE OF TRAVELING WEBS
John B. Kahoun, Wisconsin Rapids, Wis., assignor to Consolidated Papers, Inc., Wisconsin Rapids, Wis., a corporation of Wisconsin
Filed Oct. 3, 1963, Ser. No. 313,476
12 Claims. (Cl. 324—34)

The present invention relates to gauge means for determining the characteristics of materials having large surface areas, and particularly, to improved gauge means for determining the caliper (thickness) or variations in caliper occurring across the width of sheet materials, especially traveling webs of sheet material.

In several industries, notable among which is the paper industry, continuous webs of sheet material are formed and/or processed at high speed. To determine the characteristics of the material being formed and/or the effect of process steps being performed thereon, it is necessary to make several measurements. Preferably, these measurements are made directly on the web as it travels through the forming or processing machinery to afford an immediate determination of the factor or factors sought to be known. However, some tests or measurements cannot be made on the traveling web, but must be made in a laboratory on a segment of material removed from the web.

For example, in the paper industry where book papers are formed in continuous webs several feet in width at speeds up to 1800 feet per minute, it is customary to flatten the sheet by passing it through the nip of a calender, or through several calender nips. During this operation, the rolls of the calender deflect such that pressures may not be applied evenly across the sheet at the nip. Consequently, the paper machine calender stack may produce an uneven cross-machine caliper profile. This is true even when the sheet entering the stack has a uniform basis weight and moisture profile. Variations in cross-machine sheet caliper are, of course, disadvantageous and have a significant effect on paper quality. For example, when paper having uneven thickness due to variations in calendering is coated, the coating is absorbed in a manner related to the caliper before coating. The final result is variation in the printing quality of the paper. Also, hard and soft spots in rolls of paper can be traced to the base sheet caliper profile; and such hard and soft spots present problems during supercalendering, winding, printing, or other re-running of the web. According, an ability to measure cross-machine caliper profile would provide a guide to improved quality performance of the paper machine.

For many years, the need has been expressed for a continuous method of measuring caliper profile directly during the manufacture of paper and other materials in web form. In order to measure the thickness of paper to accuracies within plus or minus 1%, a criterion of commerical practicality, it is necessary to make measurements in the order of .00003 inch, based on a paper thickness of .003 inch. Instruments heretofore available for measuring paper thickness with the above degree of accuracy are comparable to a machinist's micrometer; that is, they require a rigid method of mounting similar in effect to the frame of a micrometer. When considering thickness measurements on a web of paper 15 feet wide, the frame of a suitable micrometer would have to be of monstrous proportions if the measurements were to be made on the paper machine with suitable accuracy. For this reason, cross-machine caliper measuring equipment has heretofore been in the form of a laboratory instrument necessitating removal of a segment from the web, i.e., complete severance of the web at a point downstream from the base sheet machine calender stack, removal of a full width sample of the web, and re-threading of the web through the components of the paper machine downstream of the calender. This sample then had to be removed to the laboratory, the cross-machine caliper profile measured and graphed, and the graph returned to production personnel for analysis. By the time the graph was available the machine frequently was running a different basis weight so that the graph had become, at best, merely academic. The difficulty, expense and delay in obtaining the profile mitigated against practical commercial use of the criterion in machine control; and while the desirability of and need for the measurement was well recognized, no practical way of obtaining the measurement was available.

The particular object of the present invention is to provide improved gauging means facilitating on-the-machine measurement of cross-machine web characteristics, especially the cross-machine caliper profile of webs of paper and other web materials.

In the first instance, the invention provides caliper or thickness measuring means for non-magnetic sheet materials, for example paper, comprising a caliper head containing an electromagnetic reactor or inductor for contact with one side of the sheet, and a permeable shoe for contact with the other side of the sheet and for completing the magnetic circuit of the reactor whereby the thickness dimension of the sheet forms a reluctance gap between the reactor and the shoe. Associated with the reactor is an electric circuit for energizing the reactor and for measuring a variable proportional to the reluctance of the magnetic circuit. Depending upon circuit design of element constants and variables, the variable quantity to be measured directly or indirectly may be any one of the following values; impedance of the reactor, the voltage drop across the reactor or the current flowing through the reactor, whereby to measure a quantity that varies in proportion to the variations in reluctance, and thus sheet thickness, to afford a measurement of sheet caliper.

The caliper measuring apparatus affords the advantages that the head and shoe do not require rigid mounting relative to one another, the two can have light contact with the sheet material to mitigate damage thereto, the same are easy to calibrate and maintain, and yet the apparatus affords accurate measurement of sheet thickness. Elimination of the requirement for absolute alinement and rigid correlation of the measuring components in turn leads to substantial advantages in the ability of the apparatus to be moved transversely of the web to determine the cross-machine profile. For example, the head and shoe may be hand held on each side of the paper and produce very precise measuring accuracy. Consequently, the physical requirements imposed on machinery for moving the head and shoe transversely of a web are greatly reduced.

However, it must be borne in mind that the measuring components have to be moved into and out of contact with the web, have to engage flush against the web and have to have sufficient contact pressure to sense only the thickness of the web; yet must not damage the web or engage it with such pressure as to cause tearing or other disruption of the web. The latter requirement is most serious, spelling the difference between failure and success. Two particular problems are presented, namely, movement into and out of contact with the web such that there is no damage to either the measuring apparatus or the web, and maintenance during traverse of proper engagement between the measuring apparatus and the web without exerting excessive pressure on the web.

As to the former, it is an object of the present invention to provide a carrier for the caliper head for moving the same into and out of engagement with the web; the carrier supporting the head with relative freedom for floating movement in the direction normal to the web and in such manner that when the head is separated from the web the trailing or downstream end of the head tilts toward the web. Consequently, as the carrier moves the head slowly toward the web, the downstream end of the head initially engages and floats on the web, and then becomes free to swing into flush but floating engagement with the web. In this manner, the head is applied gradually and gently to the web and does not create any sudden impact or jamming force between itself and the web which might tend to tear the web or damage the head.

As to maintenance of proper engagement between the head and the web during traverse, it is an object of the invention to provide improved means for yieldably, urging the head and the shoe toward one another to confine the web therebetween and to hold both members flush against the web. According to the invention, said means is characterized by application of the biasing force substantially at the plane of the web whereby to reduce or eliminate moment arms that might tend to induce or accommodate tilting of the apparatus due to frictional engagement with the fast moving web, and/or that might tend to accommodate separation of the measuring components from the web due to dynamic forces at the surface of the web, e.g., variations in the effective force of the boundary air on the traveling web occurring with variations in web speed.

More specifically, it is an object of the invention to provide improved means for yieldably holding the measuring components flush against the opposite sides of the traveling web comprising a magnet on one component and a permeable second component, whereby the two components are engaged with the web by virtue of magnetic forces acting at and through the plane of the web.

While the biasing force may be of predetermined fixed magnitude, it is a further object of the invention to provide a readily variable biasing force to facilitate adaptation of the gauging means to varying conditions, materials and web thicknesses, and specifically to provide means as aforesaid comprised of an electromagnet and power supply means capable of varying the magnetic force thereof.

While the objects of gently engaging the measuring head with the traveling web and of maintaining proper engagement between the head and the web during traverse were specifically devised in relation to the caliper head above described, it is to be appreciated, in retrospect, that these features and advantages of the invention are equally applicable to any measuring device that is to be physically applied to a traveling web. Moreover, the concept of applying the holding force at and through the web, as by use of magnetic forces, is applicable to many testing techniques and is not limited to measurements taken on traveling webs.

With the foregoing in mind, it is also an object of this invention to provide an improved caliper measuring device for non-magnetic materials generally, the device being characterized by a first magnetically permeable member for engagement with one side of the material, a head for engagement with the other side of the material, an electromagnetic reactor in the head having pole pieces engageable with the material, and a magnet in the head for attracting it to said first member. Thus, said first member serves to complete two magnetic circuits, i.e., the reactor circuit and the head holding circuit.

A still further object of the invention is the provision of improved measuring apparatus of the character described of sturdy construction and low cost that is readily adapted to web forming and processing machinery and affords commercially practical measuring accuracy.

In its preferred embodiment, as will presently be described, the invention provides means for automatically determining the cross-machine caliper profile of paper webs and the like as they are being produced, and for making an instantaneous graphic portrayal of the profile to inform the paper-making crew of the cross-machine caliper uniformity of the paper and to afford the crew a prompt analysis of the results of any machine changes or adjustments made by them, whereby to enhance quality performance of the machine and the crew and to afford an accurate basic measurement for elimination of the sources of many customer complaints.

Other objects and advantages of the invention will become apparent in the following detailed description.

Now, in order to acquaint those skilled in the art with the manner of making and using the gauge means of my invention, I shall describe, in connection with the accompanying drawings, a preferred embodiment of the caliper gauge and the preferred manners of making and using the same.

In the drawings:

FIGURE 1 is a front (i.e,. cross-machine) view of a preferred embodiment of the gauge means of the invention;

FIGURE 2 is a side view of the preferred embodiment of the caliper head and shoe components of the gauge;

FIGURE 3 is a vertical cross-section of the head and shoe taken substantially on line 3—3 of FIGURE 2;

FIGURE 4 is a schematic vertical longitudinal section of the head and shoe on an enlarged scale showing the magnetic circuits thereof;

FIGURE 5 is a schematic circuit diagram of one control circuit for the head;

FIGURE 6 is a schematic circuit diagram of an alternative output circuit for the head; and FIGURE 7 constitutes comparative graphs of the transverse or cross-machine caliper of a web of paper made by (a) the apparatus of this invention and (b) a conventional laboratory caliper.

Referring now to the drawings, and particularly to FIGURE 1, I have shown a gauging device comprised of a measuring head 10 and a complementary shoe 12 adapted to be engaged with the opposite sides of a traveling web W, and to be moved transversely across the web. To move the members, a traversing mechanism is provided which may suitably comprise a pair of vertically spaced parallel beams 14 and 16 disposed respectively above and below the web at right angles to the direction of web travel. Each beam slidably supports and guides a carriage 18 and 20, respectively, for movement transversely of the web. An electric motor 22 disposed adjacent one end of the lower beam 16 drives, through the intermediary of a change speed transmission 24, a pulley 26 over which an endless belt 28 is wound, the belt being supported adjacent the opposite end of the beam by an idler pulley 30 and being connected to the lower carriage 20 for reciprocating said carriage along the lower beam.

Dead-ended onto the lower carriage is a second belt 32 running from the right side of the carriage 20 to a pair of vertically spaced pulleys 33 at the right side of the lower beam, back across the machine beneath the web to a pair of vertically spaced pulleys 34 at the left side of the beams and above the web to the left side of the upper carriage 18; then from the right side of the upper carriage across the machine above the web to a pair of vertically spaced pulleys 35 at the right side of the beams, back across the machine adjacent the lower edge of beam 16 to a pulley 36 at the left end of the lower beam and then to the left side of the lower carriage 20, whereby the upper carriage is coupled to the lower carriage and is caused to duplicate the movements of the lower carriage. The illustrated mechanism is but one known means of traversing the detector assembly.

The upper traverse carriage 18 mounts thereon a reciprocating air motor 40 which supports the detector or measuring head 10 for vertical reciprocation relative to the carriage and the web, the motor being under the control of a solenoid-operated air valve 41. The lower traverse carriage 20 in turn pivotally mounts, on an axis parallel to the beams, a rod 42 which at its upper end carries the detector shoe 12 and which at its lower end is cooperable with a shoe guiding cam (not shown).

The traverse mechanism is remotely controlled from a cabinet location convenient to the paper machine operator. Only two controls need be available to the operator, namely, a selector switch and a push button. The operator selector switch has "automatic-off-manual" selection available. In the "automatic" position, a traverse will be made at every closing of an automatically operated switch, which may be operated either by a timer or some mechanism correlated to paper production for causing periodic measurements to be made. Holding this switch closed would cause continuous traverses to be made until the switch were opened. Placing the operator selector switch in the "manual" position allows the system to make one complete traverse every time the push button is pressed. Electric circuits for the stated purposes are obvious to those skilled in the art, and none is shown herein.

Between traverses, the detector assembly of head 10 and shoe 12 is located in a safe or sheltered position to one side of the web as shown in FIGURE 1, with the measuring detector or head 10 in a raised position above the bottom detector shoe 12. When a traverse is initiated by the automatic switch or by the operator push button, the traverse motor 22 is energized to drive the top and bottom traverse carriages 18 and 20 to a position located about two to six inches in from the side of the web. During this movement, the rod 42 engages a cam which causes the detector shoe 12 to be lowered below the web W as the shoe passes the edge of the web and then to be raised into contact with the lower surface of the web. When the carriages are at the point indicated, the lower carriage 20 engages a limit switch 44 which operates to stop the traverse motor 22 for about 5 seconds and to close the solenoid-operated valve 41. The air cylinder 40 then operates to lower the measuring head 10 onto the web, at a location aligned with the shoe 12, while the two carriages are stopped adjacent the edge of the web.

At the end of said time delay, the traverse motor 21 starts again and a caliper record is made by simultaneously moving the carriages 18 and 20 from adjacent the left side to adjacent the right side of the web while the head 10 and shoe 12 are engaged with the web. The traverse stops at a point about two to six inches in from the right side of the web by virtue of the carriage 20 engaging a limit switch 45. The switch 45 operates to de-energize the solenoid valve 41, causing the head 10 to be lifted off the web, and to reverse the traverse motor 22 causing the mechanism to be moved quickly to the left side of the machine. The traverse cycle is stopped when the limit switch 46 is operated by the carriage 20.

Should a paper break occur while a traverse is being made, a paper break switch is provided to automatically separate the detector elements 10 and 12 from the web. Such switch may suitably be operated by the photocells which are normally available at several locations on a paper machine to sound an alarm when a break occurs.

The foregoing apparatus is not illustrated or described in further detail in this application as traversing mechanisms and controls of the general character are known in the art.

Referring now to FIGURES 2 and 3, the detecting head 10 and shoe 12 constituting the crux of the present invention will be described in detail. As shown, the shoe 12 is comprised of an inverted generally U-shaped body 50, the legs 51 of which are apertured to facilitate pivotally adjustable mounting of the body on the support rod 42. If desired, the body could be formed of a unitary piece of magnetically permeable material, such as soft iron. However, to enhance the accuracy and reliability of the measurements to be made, I prefer to form a rectangular hole in the bight portion of the body and to mount therein parallel laminations 52 of a material having a high magnetic permeability. These laminations preferably run in the direction of web travel to minimize resistance and the possibility of damage to the web. The laminations are suitably clamped in the body 50 by means of a plurality of set screws 53 which confine the laminations between one side of the opening and a backing bar 54. Preferably, after the laminations are locked in place, the entire web engaging surface of the shoe is machined to a perfectly flat smooth surface and a thin coating of wear and corrosion-resistant material is applied thereto. This coating may be chromium or the like, or may comprise a thin layer of Teflon or a similar material having an extremely low coefficient of friction whereby to reduce to a minimum the frictional engagement between the shoe and the web. Also, the edges of the shoe are smoothly curved to mitigate the possibility of damage to the web.

The head 10 in its preferred embodiment comprises a magnetically permeable body 60, such as a soft iron cylinder, and the same is provided with two recesses concentric with one another and the axis of the body, namely, a cylindrical central recess 61 and a surrounding annular recess 62. Both recesses open to the web engaging face of the body, and this face merges into smoothly curved edge portions, whereby the body is generally of cup-shape.

Mounted within the central recess 61 is an electromagnetic reactor or inductor 63 and mounted within the outer recess 62 is an electromagnet coil 64. The reactor 63 is suitably comprised of a plurality of parallel E laminations 65 and a coil 66 wound about the center leg of the E. The E laminations are set on their sides so that the ends of the legs of the E merge or are substantially co-planar with the lower surface of the body 60, with the laminations 65 parallel to the laminations 52 in the shoe 12.

The reactor 63 and coil 64 are preferably secured within the respective recesses by an epoxy cement or the like, after which the lower face of the body and the ends of the E laminations are machined down to a perfectly smooth planar surface. Thereafter, a thin coating of wear and corrosion-resistant material, such as chromium or Teflon, is applied to the cup-shaped surface of the body 10 and the ends of the laminations 65, the same as the body 50. Preferably, the coating on both bodies is as thin as practicable to avoid loss or diminution of measuring accuracy.

The reactor coil 66 is energized from an alternating current source and the electromagnet coil 64 from either an alternating current or direct current source preferably the latter as by way of conventional rectifier means 67 connected between the AC source and the coil 64 (FIG. 5). With both coils energized, and the head 10 and shoe 12 contacted with opposite sides of a non-magnetic web, such as a web of paper, the effect is as illustrated in FIGURE 4. Specifically, the soft iron body 60 of the head 10 forms part of the flux paths for the electromagnet coil 64, which paths are completed through the laminations 52 of the shoe 12 as indicated by flux lines $h_f$ in FIGURE 4, whereby the magnet comprised of coil 64 and head 10 exerts equal magnetic forces about the full circle of the coil uniformly attracting the shoe to the head and vice versa, so that the shoe and head are held in opposed relation to one another in flush face-to-face engagement with the opposite surfaces of the web. The degree of this holding force is readily varied by varying, in any conventional manner, the current applied to the coil 64; for example, by means of a variable resistor 68 in series with the coil as shown in FIGURE 5.

At the same time, the detector or reactor coil 66 being energized from an AC source creates a magnetic circuit through the E laminations 65 which is completed through the laminations 52 of the shoe 12, as indicated by flux lines df in FIGURE 4. In this circuit, the space or gap between the laminations 65 and 52, being occupied by the non-magnetic web W, constitutes a high reluctance path, the reluctance of which varies in proportion to the width or thickness of the gap. The change in the reluctance of the magnetic circuit is reflected as an inductive change in the reactor 63, whereby the inductance of the coil 66 is proportional to the thickness of the web W since the web in essence defines the reluctance gap.

As shown in FIGURE 5, the detector or reactor 63 is comprised of resistance $R_1$ and inductance $L_1$, which together make up the circuit value determining the impedance of the device per the formula:

$$Z = \sqrt{R_1^2 + (2\pi f L_1)^2}$$

where:
Z is the reactor impedance;
$R_1$ is the reactor resistance;
f is the frequency of the applied current; and
$L_1$ is the inductance of the reactor.

The impedance is thus proportional to the inductance, so that if the other factors in the above formula remain reasonably constant, reactor impedance is proportional to the width of the gap between laminations 65 and 52, and thus to the thickness of the web W.

Impedance, applied voltage and current flowing through the coil 66 are interrelated in accordance with the formula:

$$Z = \frac{E}{I}$$

where:
Z is impedance;
E is voltage; and
I is current flow.

Consequently, variations in the gap between laminations 65 and 52 produced ba variations in the thickness of the non-magnetic web W will produce a proportional variation in the inductance of the reactor, which will in turn produce a proportional variation in impedance, and that in turn will produce proportional change in at least one of the voltage drop across and the current flowing through the reactor coil 66. It does not matter whether the variations be of linear or functional proportion, or be directly or inversely proportional, it suffices for purposes of this invention that the variations are in proportion to one another.

From this discussion, it is apparent that an inductance variation caused by change in the reluctance gap between laminations 65 and 52 may be determined by selecting a measuring quantity and appropriately devising the circuit in manners obvious to those skilled in the art so that the selected quantity will have a significant variation proportional to variations in the gap of the magnetic circuit of the reactor or detector 63. The measuring quantity could be any of:

(A) The voltage drop across the detector.
(B) The impedance change of the detector.
(C) The current flowing through the detector.
(D) The voltage drop across a resistor in series with the detector.
(E) The phase relationship of the voltage across the detector.

It is suggested that the most readily measured quantities are variations in current flow under constant voltage, and variations in voltage under constant current. The latter condition is readily established (or reasonably nearly so) by connecting in series with the reactor a resistor $R_3$ of large magnitude compared to inductor impedance, whereby changes in the reluctance gap caused by change in the thickness of the web W may be measured as a function of the change in the voltage drop across the inductor, as indicated by the term "output signal" in FIGURE 5.

Alternatively, the "output signal" may be derived as a compensated signal, or as a signal correlated to a base reference, by utilization of an output bridge such as shown in FIGURE 6. In this circuit, the variations occurring in the detector 63 are compared to or compensated by a reference or compensating device 69, which may suitably in the form of a second reactor be comprised of resistance $R_2$ and inductance $L_2$, the resistance $R_3$ in series with the reactor 63 being balanced by resistance $R_4$ in series with the compensator 69.

In a physical embodiment of the invention that has proven successful in determining the caliper profile of book paper, the shoe 12 has been of rectangular form having a face about 4½ inches long (in the direction of web travel) and about 3¼ inches wide, with the laminations 52 occupying an area about 2½ inches square in the center of this face. For cooperation with this shoe, I have used a head 10 about 3¼ inches in diameter and ¾ inches thick. The central recess 61 is $1\%_{16}$ inch in diameter and $\%_{16}$ inch deep, and the annular recess 62 has an inner diameter of $1\%_{16}$ inch, an outer diameter of $1^{11}\!/_{16}$ inch, and a depth of about ½ inch. The wall surrounding the latter recess is preferably about $\%_{32}$ inch thick so as to provide a total magnetic face area about 2 inches in diameter for cooperation with the 2½ inch square lamination area of the shoe. The remaining area of the head provides, as shown in FIGURES 2 and 3, smoothly curved edge portions facilitating relative travel of the head and the web.

By virtue of provision of a 2½ inch shoe dimension cooperable with a 2 inch magnetic head dimension, the mechanical tolerances imposed on the traverse mechanism are minimized. Also, since magnetic forces hold the shoe and head flat on a sheet with intimate contact, inaccuracies in the traverse beams or carriage guides are readily tolerated.

The ability of the above described device to measure thickness using the electrical principle involve was confirmed early. The application of this to a moving web of paper, however, was problematic. The necessity of contacting both sides of the sheet presented great concern as to runability, sheet damage and method of application. Tests established that the bottom shoe or support plate 12 could be brought into contact with the sheet without any problem. Setting the top detector 10 on the moving web, supported by the bottom shoe, constituted the real problem. Specifically, the top detector must be applied without breaking the web and must then remain in intimate contact with the web throughout the entire traverse.

Although it is important that the inertia of the detector or head 10 be kept low, it is also necessary to have the head large enough to insure that it will lie flat on the web and produce a reliable signal. Consequently, the head must have at least a fairly significant dimension in the direction of web travel, which poses the problem that the frictional resistance between the fast moving web and the head will tend to tilt the head to bring its leading edge portion forcibly into engagement with the web thereby causing jamming, tearing of the sheet and damage to the head. Further to complicate the problem, the head should have some degree of relative freedom for movement normal to the web to afford compensation for variations in web thickness, particularly since the paper-making machine is required and periodically adjusted to make different weights of papers.

Considering the head applied to the web as shown in FIGURES 2 to 4, the moment arms that would tend to permit the head to tilt relative to the web must be maintained at a minimum, yet a biasing force must be applied to the head to hold it flush or flat against the web and to hold the web flat against the shoe 12 so that the surfaces of the two detectors are parallel and spaced apart essentially only by the thickness of the web. At the same time, this biasing force must be a yieldable force to permit the head to rise and fall in accordance with variations in web thickness. To attain these objectives, I provide according to this invention biasing means disposed substantially at the plane of the web or as close thereto as possible. In some embodiments of the invention, I have provided leaf biasing springs for the head 10, the springs being disposed generally parallel to, and as close as possible to, the lower face of the head. For certain uses, this appears quite practical. For other uses, I might employ a coil compression spring or a pneumatic or hydraulic dashpot acting directly and uniformly on the marginal edge portions of a thin web contacting plate. For porous materials, I have conceived the use of vacuum holding means, for example, the combination of an imperforate or non-porous measuring or detecting head and a supporting shoe comprising a vacuum box of smaller dimensions than the head exerting a vacuum force through the sheet or web for holding the head and shoe in face-to-face relation in flush engagement with the opposite surfaces of the sheet. However, for non-magnetic sheet materials, I have found the magnetic holding means herein illustrated to be the most practical and effective. Consequently, the latter has been illustrated as the preferred embodiment of the invention, particularly where, as here, the characteristic of the sheet to be ascertained is determined or measured by magnetic principles and a single laminated shoe 12 accommodates plural magnetic paths for (1) determinative flux $df$ and (2) holding flux $hf$.

The magnetic holding means of the preferred embodiment of the invention affords the distinct advantages that the holding force is exerted directly at and through the web, whereby to minimize the possibility of tilting, and that the holding force is readily adjusted by appropriate control of the power supplied to the electromagnet coil 64. These factors are particularly important in measuring the caliper profile of rapidly moving webs of paper in paper making machines where web thickness may be changed periodically to supply customer demand. However, where web thickness is not subject to substantial change and/or the web is not readily susceptible to tearing due to excessive contact pressure, a permanent magnet or a non-adjustable electromagnet could be substituted for the adjustable electromagnet means herein illustrated and/or other of the above described holding means could be adopted. Also, it is to be appreciated that these holding arrangements can be applied to gauging means other than a caliper measuring reactor if so desired.

In addition to the above, the soft iron body 60 of the head 10 in the preferred embodiment affords the advantages that it comprises a holder for the electric components, a flux path for the electromagnet, and a magnetic shield for the reactor 63 to insure accurate measurement by the latter. Thus, the illustrated head and shoe provide for precise caliper profile measurement on non-magnetic webs.

However, there remains the problem of applying the head 10 to the web without tearing or breaking the web, without damage to the head and without disturbing the ability of the head yieldably to rise and fall with variations in web thickness. To these ends, I provide the head carriage means depicted in FIGURES 2 and 3. As shown, the head 10 includes a cover element 70 of inverted cup-shape nested over the upper central portion of the body 60 and detachably secured thereto by screws 71. On an axis parallel to the lower surface of the head and perpendicular to the E laminations of the reactor, the element 70 is provided with a pair of outwardly extending trunnions 72 defining a pivot axis between the head and a supporting bail 73. The bail, which is of two part construction to facilitate its assembly on the trunnions, is generally of inverted U-shape having relatively long legs within each of which is provided a slot 74 extending in a direction normal to the web to be measured. In the illustrated embodiment, the slots extend longitudinally of the legs and slidably and pivotally receive therein the trunnions 72, whereby the head 10 is mounted on the bail for relative pivoting movement and with freedom for floating movement in the direction normal to the web.

The bail 73 is secured at the center of its bight portion to the vertically reciprocable piston rod 40a of the air motor 40, and this motor is adjusted so that when the rod 40a is fully extended and the head 10 is engaged with the web, the trunnions 72 are disposed at approximately the mid-point of the slots 74, whereby the head is free to float on the web except for the holding force of the magnet 64.

A wire spring 75 of light spring force is wrapped loosely about the piston rod 40a and secured to the head cover 70 in such manner as to exert a very slight downward biasing force on the trailing edge portions of the head 10, i.e., the downstream portions of the head relative to the direction of web travel. When the head is removed from the web and its trunnions engaged in the bottom of the slots 74, the spring 75 positions the head in a slightly inclined or tilted condition relative to the web. Consequently, as the head is slowly lowered by the air motor 40 toward the moving web supported by the shoe 12, the trailing edge of the head first gently engages and floats on the web. Because of the inclined position of the head, no moments tending to tilt the same in the opposite direction into a jamming condition with the web are present, so that the initial contact does not result in sudden impact or any other disruptive forces on the head or the web. Secondly, the spring 75 serves to dampen pivotal movement of the head about the trunnions 72 thus preventing the head from bouncing away from the web upon initial contact. At the same time, due to its slidable mounting on the piston rod 40a, the spring is enabled to accomplish the above purposes without causing variation in the forces exerted in the direction normal to the web, such as might otherwise result from misalignment of the traverse beams. The head is free to float up and down on its carriage means without variation in the contact pressure on the web.

After initial contact of the head with the web, the head is brought flush against the web by virtue of the magnetic attraction between the head and the shoe to confine the web flat between the opposed faces of the head and shoe. It is only in the presence of this magnetic force that any significant pressure is applied to the web, and the pressure is applied over a sufficient area to mitigate damage to the web.

As a consequence of the initial tilting of the head and the holding force exerted between the head and the somewhat larger shoe, the traverse mechanism need only (1) move the head and the shoe to the correct position over the web, (2) engage the shoe with the web and slowly lower the head onto the moving web at a point aligned with the shoe, (3) maintain with relative accuracy the aligned position of the head over the bottom shoe during traverse, and (4) lift the head off the moving web at the end of the traverse. Thus, the device of this invention is not reliant upon and does not require a precision traverse mechanism, yet affords precision measurement of the cross-machine caliper profile of a paper web as it is being formed.

Specifically, in FIGURE 7, I have compared the cross-machine caliper profile obtained by the apparatus of the present invention on a traveling web directly in a paper making machine (curve A) with the laboratory measured profile of paper from the same run (curve B). There is no noticeable difference in a practical sense between the two. Curve A of FIGURE 7 was traced directly on graph paper at the paper machine operator's station on a conventional X-Y recorder connected in a conventional manner to the signal output of the reactor circuit and calibrated to a selected scale (both abscissa and ordinate) facilitating intelligent analysis of the profile. In FIGURE 7, curve B is a four sheet laboratory profile, i.e., the profile obtained from a composite comprised of four sheets or plies of the web material, and curve A was correlated to curve B by appropriate calibration of the recorder to facilitate analysis of the profiles obtained by the apparatus of this invention.

Multi-ply caliper measurement has been adopted as a standard laboratory technique so as to provide an average profile with automatic compensation for defects or flaws in individual segments of the web material. With the apparatus of my invention, an even more comprehensive averaging out is automatically obtained by virtue of the amount of web material scanned by the head 10 in a single relatively slow traverse across a high speed web. For example, with a reactor ¾ inch in diameter traversed at a speed of ten feet per minute across a web traveling at 1000 feet per minute, a given longitudinal line on the web is scanned over a length of 6¼ feet during the ⅜ of a second required for the reactor to cross that line. Consequently, the profile recorded directly on the graph paper of the X–Y recorder is very reliable.

Thus, an accurate cross-machine averaged caliper profile is instantaneously available to the machine operator at his will and directly at his machine station to facilitate judgment of what changes or adjustments, if any, might be desirable in the machine to enhance the paper quality and/or its subsequent runability. Even if positive corrective measures could not be made to compensate for poor profile, knowledge of the profile reduces or eliminates ineffective machine changes. Consequently, the present invention is a most valuable aid in making paper and other web materials.

In an immediate application, the device of my invention has been installed downstream from the base sheet calender stack in a paper making machine operating at speeds in the order of 1000 feet per minute. The caliper profiles obtained reveal the condition of the calendered base sheet and facilitate (a) calender nip adjustment to compensate for poor profile, (b) upstream adjustments to compensate for uneven sheet formation (particularly if caliper profile of the calendered sheet is correlated to basis weight and moisture content measurements taken upstream of the calender), (c) downstream adjustments, e.g., at the coating apparatus and/or winders, and/or (d) elimination of attempted adjustments that would not improve paper quality. Many traverses have been made on a variety of basis weights at a variety of machine speeds, yet paper breaks due to the calipering device run less than 1% of the traverses. There has been no detectable marking of the web by the device, and caliper profiles on all weights have been extremely accurate, even on test traverses at web speeds up to 2000 feet per minute. Additionally, by reducing the holding force, such characteristics as wrinkles in the web can readily be detected should such detection be desired.

The apparatus of the invention is, of course, applicable to areas of paper making machines other than the calendered base sheet, and are further applicable to substantially any area of any apparatus that handles or processes non-magnetic traveling webs.

To the extent of present use in the paper industry, it has been sufficient for the device of the invention to reveal simply the cross-machine caliper profile (not the actual thickness) of the paper web, and the devices have been devised for this elemental purpose. However, by calibrating the device to known thickness dimensions, correlating the X–Y recorder to the calibrations and utilizing appropriately graduated recorder graph paper, the device is equally applicable to precise determination of the actual thickness dimension of the web at all points across its width, even though the relationship between reactor output and thickness is not perfectly linear.

Moreover, the determination of caliper or caliper profile as afforded according to this invention, when appropriately correlated with basis weight and moisture content determinations available from known devices, provides means for calculation or determination of web density and quite possibly web porosity, additional important factors in paper making that heretofore have not been ascertainable directly on the machine, but only on a laboratory basis.

From the foregoing, it is thus apparent that the present invention provides significant advantages in the gauging of traveling webs and other sheet materials, and particularly provides means for obtaining the cross-machine caliper profile of non-magnetic traveling webs in a most efficient manner. It is believed, therefore, that all of the objects and advantages of the invention have been shown herein to be attained in a convenient, economical and practical manner.

While I have shown and described what I regard to be the preferred embodiments of my invention, it is to be appreciated that various changes, rearrangements and modifications may be made therein without departing from the scope of the invention, as defined by the appended claims.

I claim:

1. In a device for determining caliper of non-magnetic sheet materials, a caliper head member containing an electromagnetic reactor for contact with one side of the material, a permeable shoe member for contact with the other side of the material, said members being aligned with one another in the direction normal to the plane of the material for confining a portion of the material therebetween and for forming a magnetic circuit in which the material constitutes the reluctance gap, means independent of said reactor acting substantially at the plane of the material for urging said members toward one another to hold the members in contact with the opposite sides of the material and to confine a portion of the material therebetween, a power supply for said reactor, and means for measuring the impedance of said reactor.

2. In a device for determining caliper transversely of a web of non-magnetic sheet material, a caliper head member containing an electromagnetic reactor for contact with one side of the material, a permeable shoe member for contact with the other side of the material, said members being aligned with one another in the direction normal to the plane of the material for confining a portion of the material therebetween and for forming a magnetic circuit in which the material constitutes the reluctance gap, means independent of said reactor acting substantially at the plane of the material for urging said members toward one another to hold the members in contact with the opposite sides of the material and to confine a portion of the material therebetween, means for moving said members simultaneously across the web with said members in contact with the material and progressive portions of the material therebetween, a power supply for said reactor, and means for measuring variations in the impedance of said reactor as said members are moved across the web.

3. In a device for determining caliper transversely of a traveling web of non-magnetic sheet material, a caliper head member containing an electromagnetic reactor for contact with one side of the material, a permeable shoe member for contact with the other side of the material, said members being aligned with one another in the direction normal to the plane of the material for confining a portion of the material therebetween and for forming a magnetic circuit in which the material constitutes the reluctance gap, means for moving said members into and out of contact with the material including means for initially contacting the downstream end of one member with the material, means acting substantially at the plane of the material upon contact of the members with the material for urging said members toward one another to hold the members in contact with the opposite sides of the material and to confine a portion of the material therebetween, means for moving said members simultaneously across the web with said members in contact with the material and progressive portions of the material confined therebetween, a power supply for said reactor, and means for measuring variations in the impedance of said reactor as said members are moved across the web.

4. Caliper means comprising a pair of magnetically permeable bodies having substantially planar faces opposed to one another, carrier means for one of said bodies, trunnions on said one body defining a pivot axis transversely of said body substantially parallel to said faces, slots in said carrier means generally normal to said faces within which said trunnions are slidably and pivotally engaged, spring means between said carrier means and said one body engaged with at least one portion of said one body spaced transversely from said pivot axis for normally tilting said one body relative to the planar face of said other body, means for moving said carrier means to move said bodies toward and away from one another, magnet means in one of said bodies adjacent said planar faces thereof for urging the two bodies toward one another and for bringing their faces into juxtaposed parallel relation, and an electromagnetic reactor in one of said bodies having pole pieces exposed at said planar face thereof.

5. In a device for determining caliper of non-magnetic sheet materials, a caliper head member containing an electro-magnetic reactor and electro-magnetic coil means independent of said reactor, said caliper head member being for contact with one side of the material, a permeable shoe member for contact with the other side of the material, said caliper head and shoe members being aligned with one another in the direction normal to the plane of the material for confining a portion of the material therebetween and for forming a magnetic reactor circuit in which the material constitutes the reluctance gap, a power supply for said coil means, said coil means producing a magnetic flux between said caliper head and shoe members through the material for urging said members toward one another to hold the members in contact with the opposite sides of the material and to confine a portion of the material therebetween, and means for measuring the impedance of said reactor.

6. In a device as set forth in claim 1, said means acting to hold the members in contact with the material comprising means acting through the plane of the material for yieldably urging said members toward one another and into engagement with the opposite sides of the material.

7. In a device as set forth in claim 6, said means comprising magnetic means completing a magnetic circuit between said members through the material.

8. In a device as set forth in claim 7, said magnetic means comprising an electromagnet carried by one of said members and variable power supply means for said electromagnet, said variable power supply means serving to permit adjustment of the holding force produced by said magnetic means for holding the reactor and shoe members in contact with opposite sides of the material, such adjustment being independent of said power supply for said reactor.

9. In a device as set forth in claim 7, said caliper head having a pair of recesses therein, said electro-magnetic reactor being mounted in one of said recesses and said magnetic means being mounted in the other of said recesses.

10. In a device as set forth in claim 7, said caliper head comprising a circular magnetically permeable body having a substantially planar face and smoothly curved edge portions merging with said face, a pair of recesses in said body concentric with one another and said body and opening at said face, said electromagnetic reactor being mounted in one of said recesses and having pole pieces exposed at said face and merging therewith, said magnetic means comprising an electromagnet coil in the other of said recesses adjacent said face.

11. In a device as set forth in claim 1 for determining the caliper of a traveling web, one of said members being movable into and out of engagement with the web and having a significant dimension in the direction of web travel, and carrier means mounting said member for floating movement normal to the web, said carrier means when said member is separated from the web tilting the downstream end of said member toward the web, whereby the downstream end of said member is initially contacted with the web as the member is moved toward the web and the member thereafter floatingly engages flush against the web.

12. In a device as set forth in claim 11, trunnions on said member defining a pivot axis transversely of said member substantially parallel to the web, said carrier means having slots therein generally normal to the web within which said trunnions are slidably and pivotally engaged, and spring means between said carrier means and said member engaged with at least one portion of said member spaced transversely from said pivot axis for normally tilting said member relative to said carrier means.

References Cited

UNITED STATES PATENTS

| | | | |
|---|---|---|---|
| 1,872,351 | 8/1932 | Schaake et al. | 324—37 |
| 1,989,037 | 1/1935 | Brown | 324—34 |
| 2,637,115 | 5/1953 | Watson | 324—34 |
| 2,665,333 | 1/1954 | Dunipace et al. | 324—34 |
| 2,923,150 | 2/1960 | Imboden et al. | 73—159 |
| 2,116,119 | 5/1938 | Loewenstein | 324—34 |
| 2,162,710 | 6/1939 | Gunn | 324—34 |

OTHER REFERENCES

Hart, John A.: Magnetic Caliper Guages for Papers. Pulp and Paper Magazine of Canada, November 1951 pp. 102–104 and p. 118. Copy in 162–263.

RUDOLPH V. ROLINEC, *Primary Examiner.*

R. J. CORCORAN, *Assistant Examiner.*